April 21, 1953
L. MERCY
2,635,337
NOTCHED LINOLEUM CUTTING KNIFE
Filed April 28, 1951
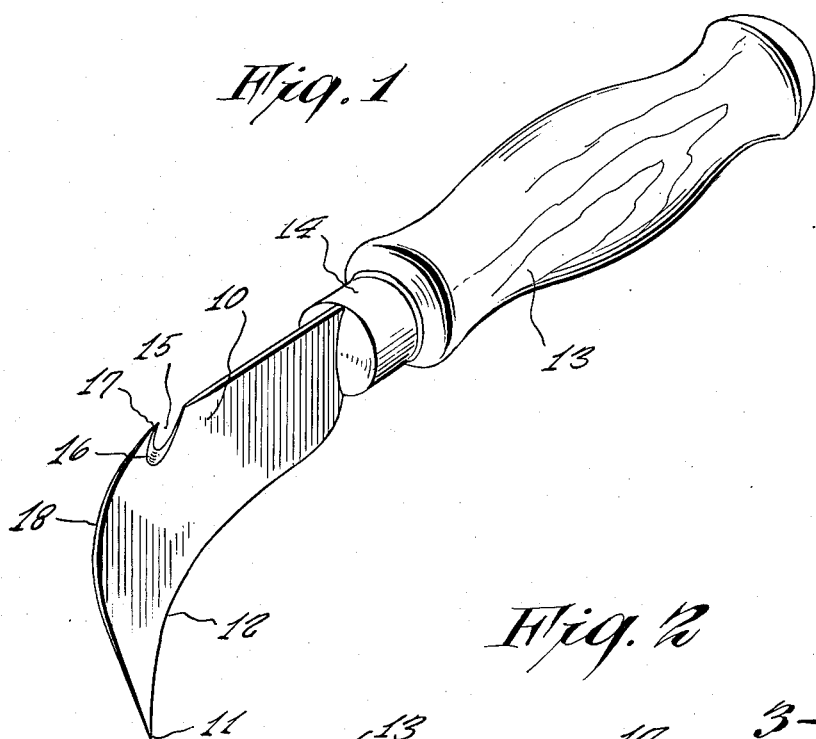
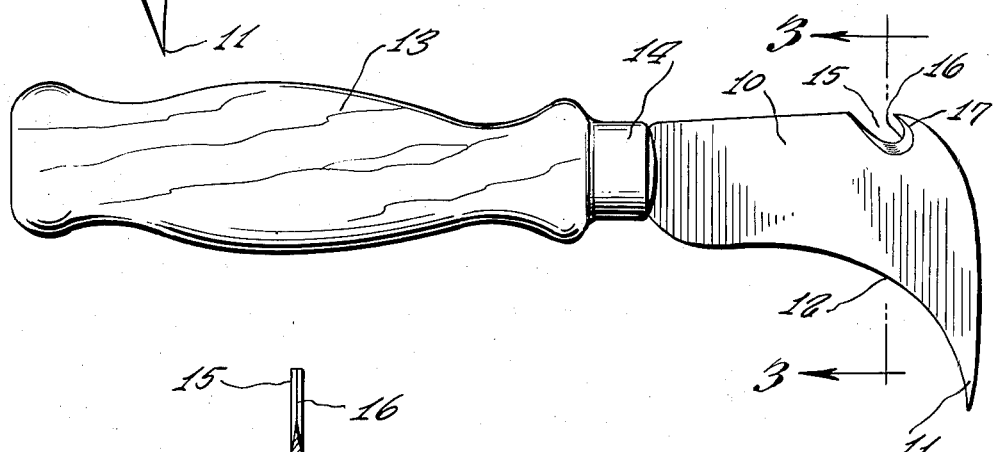
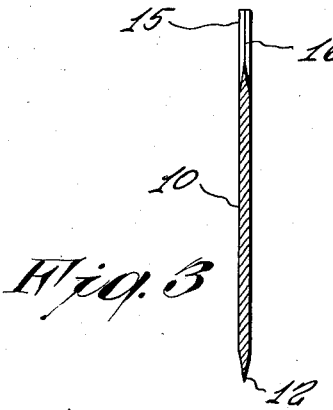
INVENTOR.
LEE MERCY
BY
Carl Miller
ATTORNEY Patented Apr. 21, 1953

2,635,337

UNITED STATES PATENT OFFICE 2,635,337

NOTCHED LINOLEUM CUTTING KNIFE

Lee Mercy, Flushing, N. Y.

Application April 28, 1951, Serial No. 223,539

1 Claim. (Cl. 30—353)

This invention relates to a double purpose knife.

It is an object of the present invention to provide a linoleum knife for cutting linoleum floor carpet wherein for fine cutting a point is provided extending from a sharpened hook formation having a cutting edge and wherein on the opposite side of the blade is a hook cut into the edge thereof and sharpened in such a manner as to effect easy and faster cutting of the linoleum or carpet material.

Other objects of the invention are to provide a double purpose knife for cutting linoleum carpeting which is of simple construction, inexpensive to manufacture, easy to grind and keep sharp, less tendency for the cutting edge to become dull since the hook is formed by a cut in the edge of the blade, has less tendency for knife to walk away from the scribe line, and is convenient to use.

For a better understanding of the invention, reference may be had to the following detailed description taken in connection with the accompanying drawing, in which:

Fig. 1 is a perspective view of the double purpose knife embodying the features of the present invention.

Fig. 2 is a side elevational view of the knife.

Fig. 3 is a transverse sectional view taken on line 3—3 of Fig. 2.

Referring now to the figures, 10 represents a blade adapted for use in cutting linoleum carpet which has a pointed end 11 for fine scribe cutting. A cutting edge 12 extends from the point rearwardly along the hook formation of the blade. The blade is secured rigidly to a large handle 13 and retained therein by a ferrule 14. On the opposite edge of the blade 10, there is cut at an angle extending forwardly and inwardly from the edge thereof a notch 15 which is sharpened to provide a cutting edge 16 for fast and easy cutting. The notch provides, in the manner in which it is cut, a point or hook formation 17. The cutting edge 16 is fully protected by the outer edge of the blade 10 so that it can not readily become dull. The edge of the blade prevents contact with a strange surface.

To effect a cutting of the carpet material, the edge of the carpet is extended into the notch 15 and by a pulling stroke bringing the cutting edge 16 into the carpet material and along a scribe line, the carpet will be readily and quickly severed.

It will accordingly be seen that the hook formed by the notch 15 and the deep cutting edge can be sharpened with a special grinding tool. There is little tendency for the knife to walk away from the scribe line when this cutting edge 16 with the material in the notch is used. The rounded cutting edge within the notch allows for free and smooth movement of the knife against the material. There is less chance of the cutting edge 16 to become dull because there is no contact with a strange surface other than with the material being cut.

The handle can be of any shape or size and attached in any suitable manner. The rounded edge of the forward edge of the knife blade as indicated at 18 may bear against a flat surface while the cutting is being effected. Accordingly, there is little chance of the knife being caught or retained against its movement through the carpet.

While various changes may be made in the detail construction, it shall be understood that such changes shall be within the spirit and scope of the appended claim.

I claim:

A double purpose knife for cutting linoleum material and the like, comprising a curved blade having a convex and concave side, the said concave side having a cutting edge terminating in a pointed end, the convex side of the said blade having an acute angled notch extending substantially in a direction towards said pointed end, and a second cutting edge disposed along said entire notch and extending from one predetermined point of the said convex side of the blade to another point of the said convex side of the blade, so that the portion of the said convex side of the blade between the said notch and the said pointed end of the blade operates as a guide for the cutting of the linoleum along a scribed line.

LEE MERCY.

References Cited in the file of this patent

UNITED STATES PATENTS

| Number | Name | Date |
|---|---|---|
| 123,497 | McCarraher | Feb. 6, 1872 |
| 732,911 | Abbey | July 7, 1903 |
| 1,813,498 | Kosunen | July 7, 1931 |
| 1,843,223 | Hasseler | Feb. 2, 1932 |
| 1,988,386 | Komperud | Jan. 15, 1935 |

FOREIGN PATENTS

| Number | Country | Date |
|---|---|---|
| 551,719 | Germany | June 3, 1932 |